May 14, 1963 R. L. EARLY 3,089,594
SHAPE AND HEIGHT DETECTION
Filed June 13, 1960 5 Sheets-Sheet 1

INVENTOR.
RICHARD L. EARLY
BY
J. R. NELSON &
W. A. SCHAICH
ATTORNEYS

May 14, 1963 R. L. EARLY 3,089,594
SHAPE AND HEIGHT DETECTION
Filed June 13, 1960 5 Sheets-Sheet 2

INVENTOR.
RICHARD L. EARLY
BY J. R. NELSON &
W. A. SCHAICH
ATTORNEYS

May 14, 1963 R. L. EARLY 3,089,594
SHAPE AND HEIGHT DETECTION
Filed June 13, 1960 5 Sheets-Sheet 3

INVENTOR.
RICHARD L. EARLY
BY J. R. NELSON &
W. A. SCHAICH
ATTORNEYS

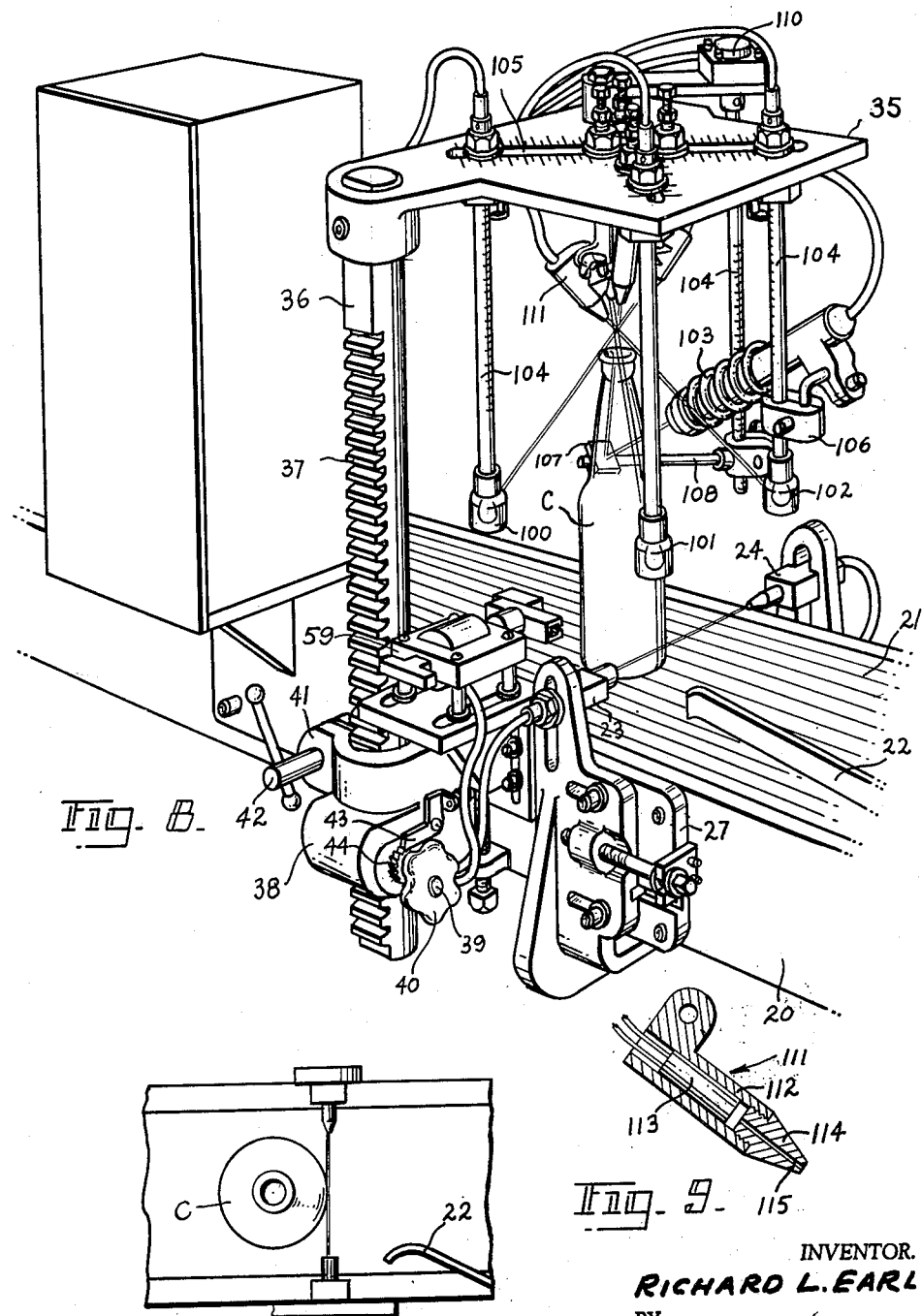

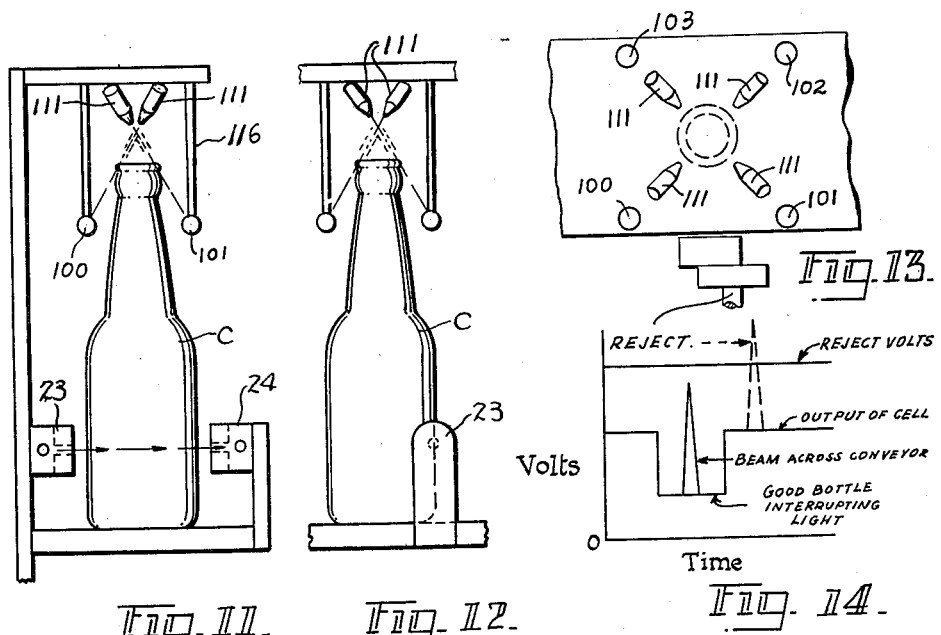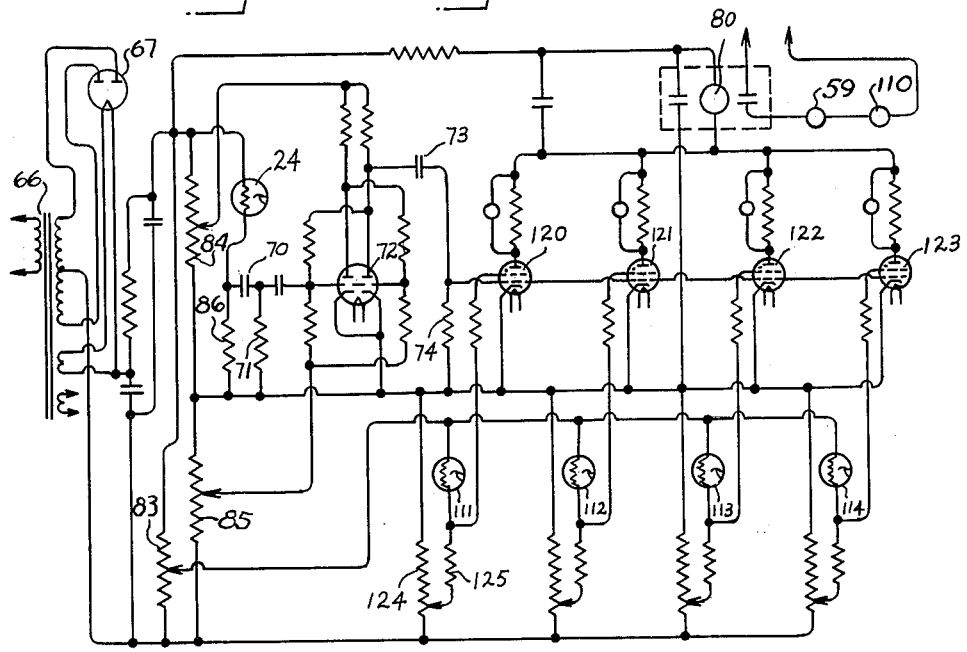

United States Patent Office 3,089,594
Patented May 14, 1963

3,089,594
SHAPE AND HEIGHT DETECTION
Richard L. Early, Toledo, Ohio, assignor to Owens-Illinois
Glass Company, a corporation of Ohio
Filed June 13, 1960, Ser. No. 35,579
30 Claims. (Cl. 209—111.5)

This invention relates to the inspection of articles and particularly to the inspection of hollow containers such as glass containers to determine whether the shape and height are acceptable.

In the filling and handling of hollow containers such as glass containers, it is essential that the shape of the container and particularly the position of the filling and dispensing opening, commonly known as "finish," be proper in order to make the container easily handled in high speed handling and filling equipment. If the finish is not properly aligned with the base of the container, a condition commonly known as "leaner," or if the height of the finish is improper, then the container cannot be handled in the material handling and filling equipment.

It is an object of this invention to provide a method and apparatus for instantaneously comparing the position of one part of an article with several other parts.

It is an object of this invention to provide such a method and apparatus wherein the inspection is conducted while the article is moving on a continuous conveyor.

It is a further object of the invention to provide such a method and apparatus wherein the article is inspected without physical contact with any part being inspected.

It is a further object of the invention to provide a method and apparatus for inspecting hollow containers to determine whether the finish is out of alignment with the base.

It is a further object of the invention to provide a method and apparatus for inspecting hollow containers to determine whether or not the height of the container is within predetermined limits.

It is a further object of the invention to provide a method and apparatus for inspecting hollow containers to determine simultaneously whether the finish thereof is sufficiently concentric with or in alignment with the base and whether the height of the container is within predetermined limits.

In the drawings:

FIG. 4 is a sectional view of a portion of the apparatus shown in FIG. 2.

FIG. 8 is a fragmentary perspective view similar to FIG. 1, parts being broken away.

FIG. 9 is a sectional view of a portion of the apparatus shown in FIG. 8.

FIG. 10 is a fragmentary plan view of a portion of the apparatus shown in FIG. 8.

FIG. 11 is a diagrammatic front elevation of the apparatus shown in FIG. 8.

FIG. 12 is a diagrammatic side elevation of the apparatus shown in FIG. 11.

FIG. 13 is a diagrammatic plan view of a portion of the apparatus shown in FIGS. 11 and 12.

FIG. 14 is a represenation of the signal produced in the apparatus shown in FIG. 8.

FIG. 15 is a diagrammatic wiring diagram of the apparatus shown in FIG. 8.

Basically, the invention comprises providing an inspecting station through which the articles, such as containers, to be inspected are moved continuously by a continuously moving conveyor. At the inspection station, portions of the container are adapted to be illuminated by beams of light. Photocells having a limited field of vision, as presently described, are positioned with their axes in line with the associated beams of light. An additional light beam is positioned to project light transversely of the container adjacent the conveyor. A photocell having limited field of vision is positioned opposite this latter beam for receiving the light from said beam. As the article to be inspected approaches the inspecting station, it interrupts the beam of light adjacent the conveyor producing a first conditioning pulse that conditions the electronic circuit which is associated with the mechanism. As the container continues to move and leaves the field of the beam adjacent the conveyor a second gauging pulse is directed to the electronic circuit and the container is inspected. The inspecting light beams and their associated photocells are so positioned that at the moment of inspecting, a signal pulse will be produced in the event that the photocells are receiving or not receiving light as is required by their established position. For example, in checking the height of a container, two photocells are used and are adapted to be positioned so that one will receive light and the other will not receive light if the height of the container is proper. The electronic circuit is such that if this condition is not fulfilled a signal pulse is produced which actuates a mechanism rejecting the container. Similarly, in the case of checking a container for leaners, a plurality of light beams are adapted to be intercepted by the finish of the container so that the associated photocells will not receive light if the container is within limits. However, if any one of the photocells receives light then a signal pulse is produced to reject the container.

Figure 1:
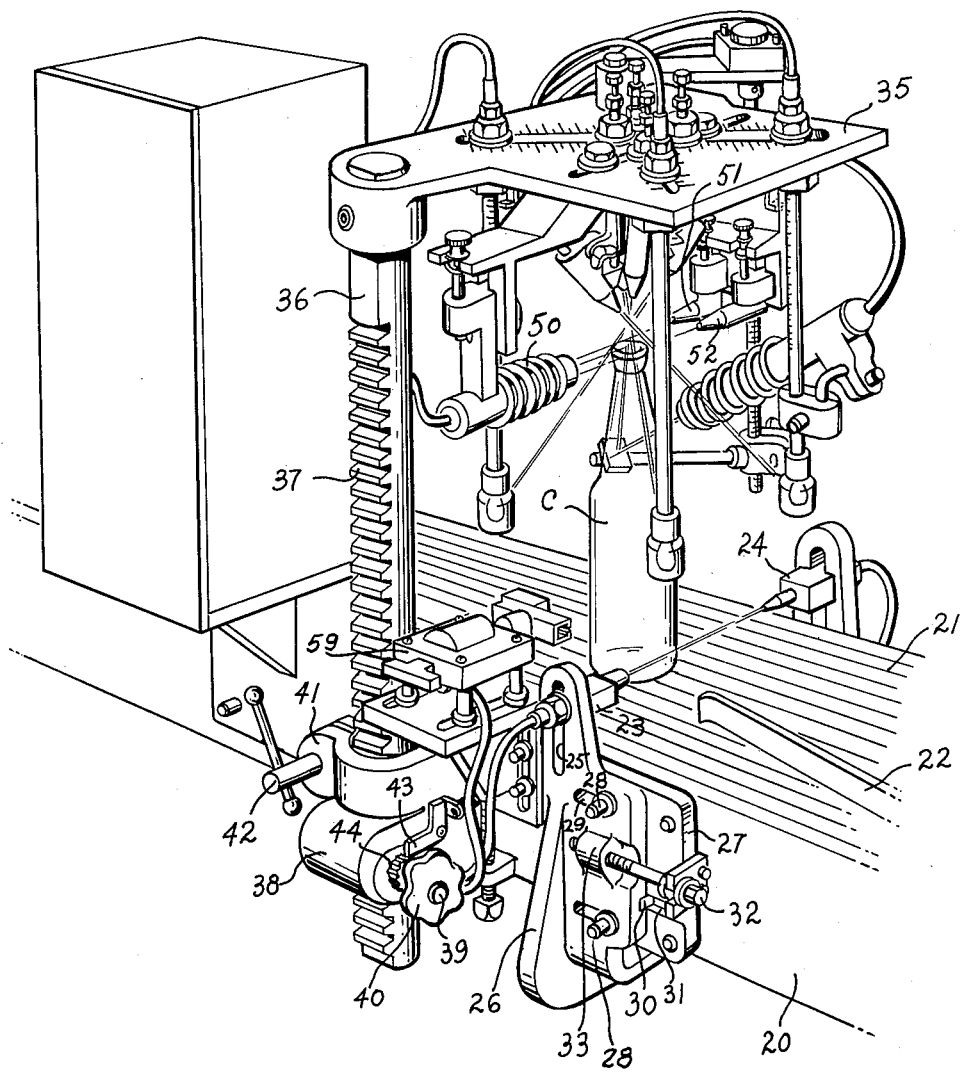
FIG. 1 is a perspective view of an apparatus embodying the invention.

Referring to FIG. 1, the apparatus embodying the invention comprises a support 20 along which an endless conveyor 21 is moved to successively bring containers C, herein shown as glass bottles, to and through an inspecting station positioned along the conveyor 21. As each container C is moved along by the conveyor 21 it contacts a fixed lateral positioning and spacing bar 22 which is mounted in the path of the containers C. The spacing and positioning bar 22 extends at an angle into the path of each container and guides or cams the container toward the center of the conveyor thereby spacing each container laterally on the conveyor as is required to provide a proper and accurate inspection of the container. The bar 22 also retards the forward motion of each container sufficiently to space the containers. As each container leaves the bar 22 it accelerates to the speed of the conveyor leaving a gap between it and the succeeding container. This gap is necessary to the operation of the apparatus.

As each container C approaches the inspecting station, the base of the container intercepts a horizontal beam of radiant energy such as incandescent light which is directed transversely of the conveyor by a light source 23. A photoelectric cell assembly 24 positioned in the path of the beam receives the rays of energy from the beam. As the leading edge of the container C intercepts the beam from the source 23, a signal pulse is produced to condition the electronic circuit associated with the apparatus as presently described. As the trailing edge of the container C leaves the beam and the cell again sees the beam, a second signal pulse energizes the electronic circuit to inspect the container and reject it if it is not within predetermined limits.

As shown in FIG. 1, light source 23 is adjustably mounted in a vertical slot 25 in bracket 26. Bracket 26 is, in turn, adjustably mounted for movement longitudinally of the conveyor on a plate 27, by bolts 28 which extend through slots 29. The bracket 26 includes a key 30 which engages a slot 31 in plate 27 and guides the movement of the bracket 26 along the plate 27. A screw 32 having its head journalled on plate 27 is threaded into a boss 33 on the bracket so that by rotating the screw 32 the bracket 26 is caused to move back and forth longitudinally on the conveyor to any selected position. By tightening the bolts 28, the bracket 26 is held in fixed adjusted position relative to the plate 27. Cell assembly 24 is adjustably mounted in the same manner as light source 23.

The apparatus includes means at the inspecting station for directing beams of radiant energy against the various portions of the container and associated photocells for intercepting the beams. These beams and photocells are mounted on a horizontal plate 35 which is fixed on a vertical shaft 36. The shaft 36 is, in turn, mounted for vertical movement relative to the conveyor 21 so that the shaft can be positioned in any desired vertical position to the conveyor 21. Specifically, shaft 36 is provided with a rack 37 of teeth. The shaft extends through a vertical opening in a bracket 38 mounted on the base 20. A pinion (not shown) is fixed on a shaft 39 journalled in the bracket 38 and engages the teeth of rack 37 on shaft 36. A knob 40 is fixed on shaft 39 so that when it is rotated the shaft 39 causes the pinion thereon to rotate and move the rack 37 and in turn the shaft 36 and horizontal plate 35 up or down. Bracket 38 includes a split clamping portion 41 which is adapted to be clamped in position around shaft 36 by a threaded shaft 42 to hold the shaft 36 in any predetermined adjusted position. A spring loaded pawl 43 is provided in association with a toothed wheel 44 on shaft 39 to serve as a positive lock to prevent the inadvertent movement of the shaft 36 downwardly.

Horizontal plate 35 supports light sources and photocells for checking a container to determine whether the container is within the predetermined height limits and determine whether the finish of the container is out of alignment with the base of the container.

Height Inspection

Figure 2:
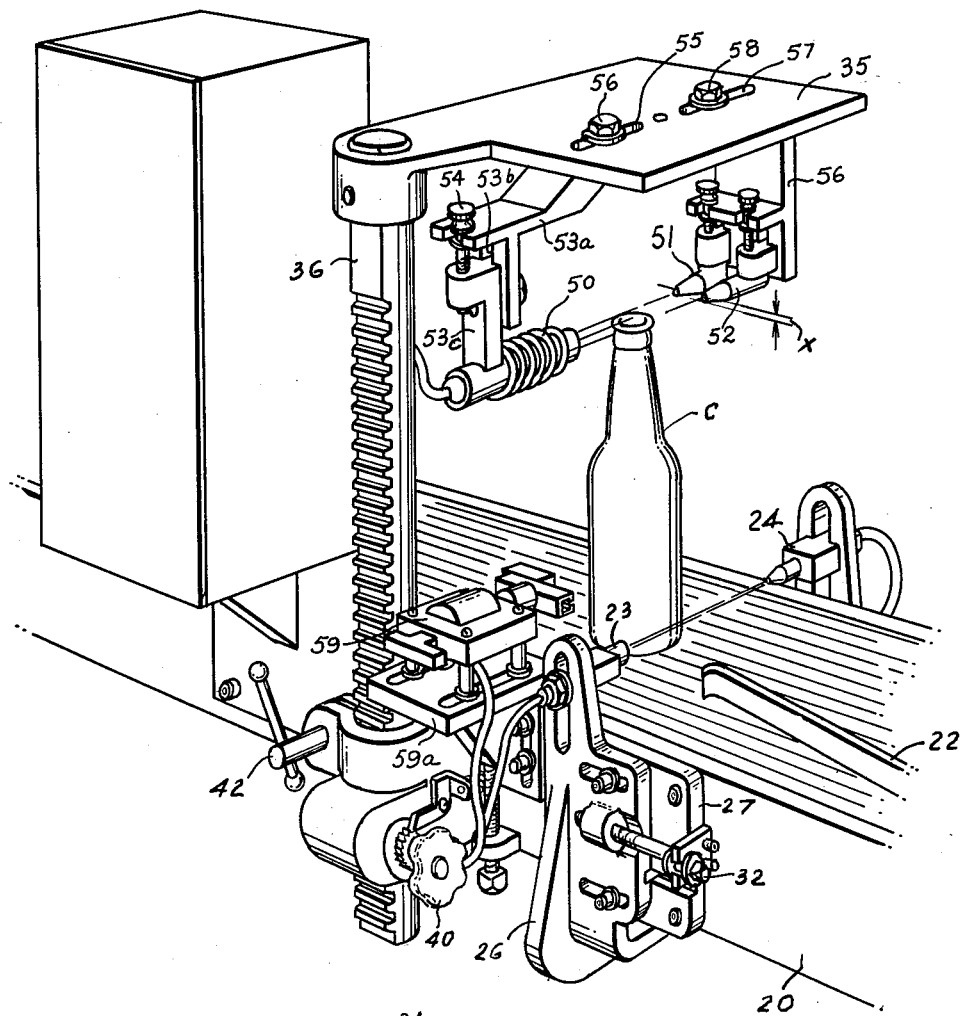
FIG. 2 is a fragmentary perspective view similar to FIG. 1 with parts being broken away.

Referring to FIG. 2 which is a view similar to FIG. 1 with parts being broken away leaving only the light and photocell arrangement for checking height, it can be seen that a source of radiant energy 50, which can be of the incandescent type, is provided for directing a collimated beam horizontally and laterally of the container in such a position that the upper end of the container will intercept portions of the beam. If the article is large or of odd shape, two or more light sources may be used. A pair of photocell assemblies 51, 52 are mounted opposite the light source 50 with their line of sight extending as presently described. One of the photocell assemblies 51 is adapted to receive light from the light source 50 and the other photocell assembly 52 is adapted to have its line of vision intercepted by the upper end of the container in the event the container is within the predetermined height requirements.

As further shown in FIG. 2, light source 50 is supported for a vertical adjustable mounting movement on a bracket 53a by an arrangement which includes a vertical slot 53b in bracket 53a which is engaged by a corresponding portion of a support 53c on the source 50. A screw 54 journalled in bracket 53a is threaded in support 53c to move the support upwardly or downwardly. Bracket 53a is, in turn, mounted on horizontal plate 35 for movement laterally of the conveyor by an arrangement which includes a slot 55 in the plate 35 and a bolt 56 extending through the slot and threaded into the bracket 51.

Photocells 51, 52 are mounted for vertical adjustment on a bracket 56 by an arrangement similar to the mounting of source 50. Bracket 56 is mounted for adjustment laterally of the conveyor by an arrangement which includes a slot 57 and a bolt 58 extending through the slot 57 and threaded into bracket 56. A reject solenoid 59 is provided adjacent conveyor 21 and is mounted on a bracket 59a which is adjustable vertically and laterally of conveyor 21 by a slot and bolt arrangement.

The photocell assemblies 51, 52 and 24 are of a particular construction such that their field of vision is substantially limited. As shown in FIG. 4, photocell assembly 51 comprises a light sensitive element 60, such as a photocell, positioned in a cylindrical casing 61 and a removable directional head 62 which has an orifice or opening 63 that has a length many times its diameter. One example of photocell element 60 which has been found satisfactory for these assemblies is a crystal type cadmium selenide photocell. For example, the orifice 63 can have a diameter of .015" and a length of .500". By this arrangement, the field of vision of the photo-sensitive element 60 is limited to a very small area.

Figure 6:
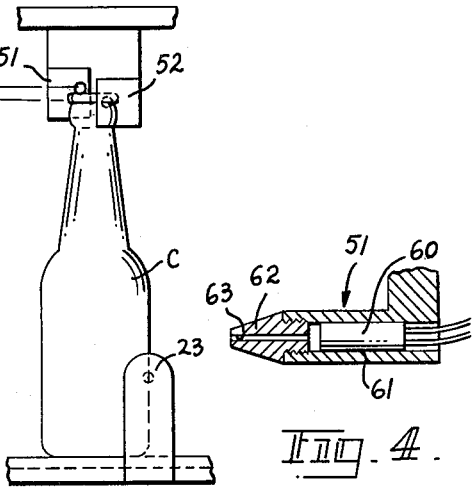
FIG. 6 is a diagrammatic side elevation of the apparatus shown in FIG. 5.

In the arrangement shown in FIG. 2, for checking the height of a container, the photocell assemblies 51, 52 are arranged with their lines of sight vertically spaced a distance X. This arrangement is shown diagrammatically in FIG. 6 wherein when as the trailing edge of the container C just leaves the beam from the light source 23, a signal pulse is created which energizes the electronic circuit to check the container. The arrangement of the photocell assemblies 51, 52 is such that for a container within the proper limits the line of sight of photocell assembly 51 will receive light from the source 50 while the line of sight of photocell assembly 52 will not receive light from the source 50.

If the height of the container is above the predetermined maximum then the upper end of the container will intercept the light and photocell assembly 51 will not receive light. This will produce a signal pulse to actuate the electronic circuit and to reject the container C. If the height of the container is below the minimum permissible height then light will not only pass to photocell assembly 51 but also to photocell assembly 52 and a signal pulse will energize the electronic circuit to reject the container C.

Figure 7:
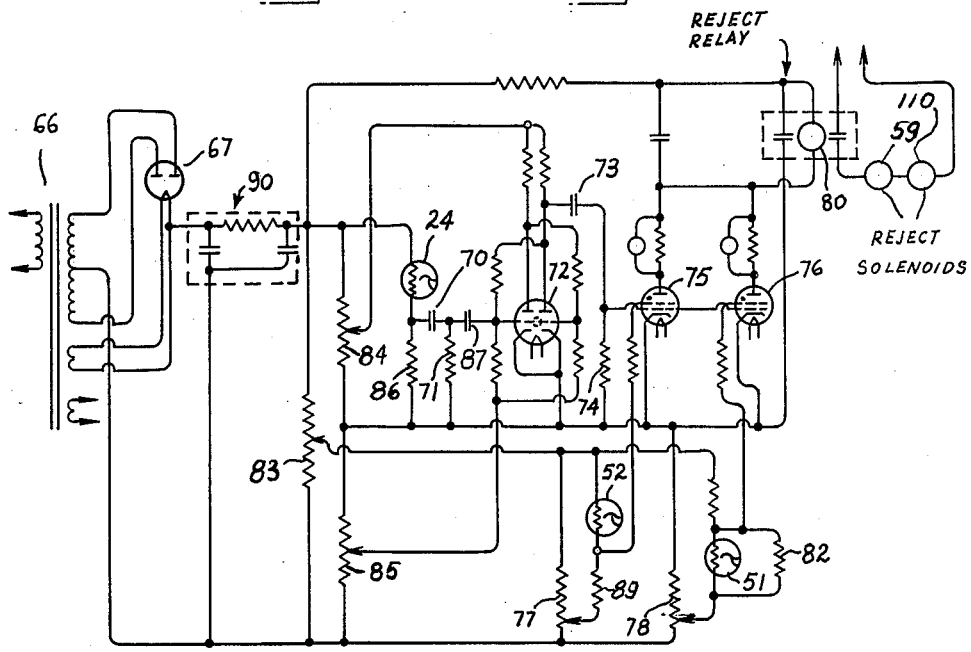
FIG. 7 is a diagrammatic wiring diagram for the apparatus shown in FIG. 2.

Referring to FIG. 7, which is a diagrammatic wiring diagram of the portion of electronic circuit for use with the apparatus shown in FIGS. 2-6, for checking the height of a photocell container such as a glass container, identical numerals have been used for identifying the photocells for purposes of convenience. The circuit includes a source (not shown) of power including a transformer 66 and a full wave rectifier 67. This produces a D.C. voltage across resistor 83. This D.C. voltage is referred to as the main D.C. voltage supply. The element 90 is a D.C. filter in combination with the rectifier 67. As shown in FIG. 7, photocell 24, which is intercepted by the leading and trailing edges of the container C, is connected with a condenser 70 and a resistor 71 so that the signal from the photocell is differentiated in order that it can assume a more suitable shape for application to a bistable multivibrator of the Eccles-Jordan type. The output of a photocell 24 is applied to the grids of a twin triode vacuum tube, as a 6SN7 tube 72 which forms part of the multi-vibrator circuit.

As the leading edge of the container intercepts the transverse light beam from the light source 23, the internal resistance of cell 24 rises, as is characteristic of many types of photocells. Resistors 84 and 85 form a voltage divider across the main D.C. voltage supply. The voltage across resistor 84 is used as a voltage supply for the combination of photocell 24 and its associated load resistor 86. When the resistance of photocell 24 rises, the voltage across resistor 86 will fall, and vice versa. The voltage across the resistor 86 is referred to as the "output voltage" of the photocell. The fall in the output voltage of photocell 24, occurring when the leading edge of the bottle intercepts the transverse light beam, is differentiated into a negative voltage pulse by condenser 70 and resistor 71. This pulse is then transmitted through condenser 87 to the left control grid of tube 72. As the bottle progresses through the light beam, a major portion of the light beam passes through the transparent bottle and reaches the cell 24. This is a relatively gradual increase in light on the cell, however, and is not formed into a voltage pulse by the differentiator. As the trailing edge of the container enters the light beam, the light on the cell is gradually decreased until it is almost completely cut off due to the substantial thickness of the glass in the bottle at its trailing edge. Again, this gradual decrease is not formed into a pulse by the differentiator. When the trailing edge of the container reaches the light beam, the resistance of the photocell is abruptly decreased and its output voltage increases suddenly. The differentiator changes this sudden increase in voltage to a positive voltage pulse which is transmitted through condenser 87 to the left control grid of tube 72. Thus, the left grid of tube 72 receives a negative voltage pulse when the container intercepts the light beam and a positive voltage pulse when it leaves the light beam to cause the negative voltage pulse applied to the left half of the tube to be cut off. This causes its plate voltage to rise. This rise in voltage is transmitted to the right-hand grid causing the right half to begin conducting and conduct heavily. The tube remains in this condition until some subsequent action takes place to change it. When the right side of tube 72 starts conducting, the fall in its plate voltage is differentiated by condenser 73 and resistor 74 and applied to the control grids of thyratrons 75 and 76. The positive voltage pulse applied to the left grid of tube 72 when the bottle leaves the light beam causes the left half of the tube to conduct and the right half to be cut off. This is the reverse of the action described above. When this occurs, a positive voltage pulse is transmitted to the control grids of the thyratrons. Thus, there is a negative voltage pulse transmitted to the grids of thyratrons 75 and 76 when the bottle intercepts the light beam, and a positive voltage pulse transmitted to their grids when the container leaves the light beam. The positive pulse is referred to herein as the "gauging pulse," Thyratrons 75, 76 are normally not conducting, their shield grids being biased negatively.

As shown in FIG. 7, the shield grids of thyratrons 75, 76 have a bias applied thereto by potentiometers 77, 78, respectively. The photocells of assemblies 52, 51 are connected in such a manner as to modify this shield grid bias. If no light is on the photocell of assembly 52, the voltage applied to the shield grid of thyratron 75 is determined solely by the position of the arm on the potentiometer 77 but if light strikes the photocell of assembly 52, a current will flow through the resistor 89 and the voltage drop across this resistor 89 will tend to cancel out the negative bias applied by the potentiometer 77. The setting of the potentiometer is such that if there is light striking the photocell of assembly 52 at the time the positive gauging pulse occurs, the thyratron 75 will fire energizing relay 80 and operating the reject solenoid 59. Relay 80 is of a type such that when it closes, it shorts out its supply voltage. This extinguishes the thyratron 75 and returns the plunger of solenoid 59 to its normal position.

Again referring to FIG. 7, a negative voltage is fed to the shield grid of thyratron 76 from the potentiometer 78 through resistor 82 which is in parallel with photocell of assembly 51. If no light is striking photocell 51, the magnitude of the negative voltage is determined by the position of the potentiometer arm on potentiometer 78 and the current flow through resistor 82. The voltage drop caused by this current flow is in opposition to the potentiometer voltage and the actual bias is the difference between these two voltages. When light strikes the photocell 51, the effective resistance of the parallel combination of the photocell of assembly 51 and resistor 82 is reduced. This lowers the voltage across the combination and hence raises the actual bias voltage. The setting on potentiometer 78 is such that if there is light striking photocell of assembly 51 at the time the second or gauging pulse from cell 24 occurs, thyratron 76 will not fire. If, however, light is not striking photocell of assembly 51 at the time the gauging pulse occurs, the thyratron 76 will fire rejecting the container by energizing relay 80 to energize the reject solenoid 59 and, in turn, de-energize the thyratron 76 and reset the solenoid 59. Thus, a container which is of proper height will not produce a signal for firing either of the thyratrons 75, 76. If, however, a bottle is too short, photocell of assembly 52 will receive light and energize thyratron 75 to reject the container. If the container is too tall, photocell 51 will not receive light and thyratron 76 will be fired to reject the container.

*Concentricity of Finish Inspection*

The apparatus shown in FIG. 1 operates not only to inspect for height of the container but, in addition, to determine whether the upper end or finish of the container is in proper relation to the bottom of the container, that is, to determine whether the finish is concentric with the bottom. If this condition does not exist, the container is called a "leaner" or "off-center" container.

Referring to FIG. 8, for purposes of clarity, the light source 50 and photocell 51, 52 which are used for inspecting for height and their associated mounting structures have been removed. As shown in FIG. 8, as a container C such as a glass bottle is moved along the conveyor 21 it comes into contact as heretofore described with the lateral positioning and spacing bar 22 which not only serves to locate the container C laterally of the conveyor, but, in addition, to retard its movement to thereby space it longitudinally on the conveyor.

As the bottom of the container C enters the light beam from source 23, it produces a conditioning pulse which conditions the electronic circuits and as it leaves the light beam 23, it produces a gauging pulse for energizing the electronic circuit to check the concentricity of the finish of the container relative to the bottom of the container.

As further shown in FIG. 8, the check of concentricity is achieved by directing light beams upwardly and inwardly and positioning photocells having a limited field of vision with their lines of sight intercepting the light beams. The arrangement of the light beams and photocells is such that if at the time of gauging the finish is concentric with the bottom of the container, the photocells will not pick up any of the light beams. If any portion of the finish does not intercept a light beam then the beam will pass to its respective photocell at the time of gauging and produce a pulse which actuates the electronic circuit to energize the solenoid and reject the container C.

Specifically, sources 100, 101, 102 and 103 of radiant energy, which can be of the incandescent type, are adapted to direct light beams upwardly and inwardly in position so that the finish of the container C intercepts the light beams. Each of the light sources 100, 101, 102 is mounted on the lower end of their respective shafts 104. Each shaft 104 is, in turn, adjustably mounted for vertical and inward and outward movement by a clamping arrangement in diagonal slots 105 in plate 35. In order to provide room for rejecting the container C, light source 103 is mounted by a clamp 106 on shaft 104 which supports the light 102. Source 103 directs a collimated beam against a mirror 107 which is adapted to reflect the beam onto the finish of the container. Mirror 107 is mounted on a rod 108 and, in turn, is fixed on a shaft 109 that is adapted to be rotated by a rotary solenoid 110 so that the mirror 107 can be swung out of position by energization of the solenoid 110 whenever the container is to be rejected by the reject solenoid 59.

A photocell assembly 111 is associated with each beam 100, 101, 102, 103. Photocell assemblies 111 are identical to photocell assemblies 24, 51, 52 heretofore described and as shown in FIG. 9, comprise a cylindrical body 112 in which a photoelectric pick-up 113 is positioned and a removable head 114 having an orifice 115 therein which has a substantially greater length than diameter thereby providing a limited field of vision for the photocell. The relative arrangement of the light beams and photocells is shown diagrammatically in FIGS. 11 and 12.

The relative arrangement of the light beams and photocells is also shown in FIG. 13 which is a plan view showing the arrangement about the container.

For purposes of clarity, the portion of the electronic circuit for inspecting for concentricity of the finish has been shown separately in FIG. 15. It should be understood that the portion of the circuit which conditions the electronic circuit and provides the gauging pulse for inspection, which includes the photocell 24, is identical to that portion used in checking height of the container as shown in FIG. 7.

Thus, in the circuit shown in FIG. 15, the photocell 24 receives light from the light beam 23. When light is on the photocell 24, a voltage, positive to ground, appears at the top of the resistor associated with the photocell. When no light reaches the photocell 24, this voltage falls to zero or nearly zero. As the container C moves into the light beam from the source 23, the beam is almost completely shut off for a short time as the leading edge of the bottle wall is in its path. While the center of the bottle is passing the beam, a major portion of the light reaches the cell 24. When the trailing edge or wall of the container passes the beam, the light is almost completely shut off again because of the greater thickness of the wall. Thus, two voltage pulses are provided by the cell 24, one when the leading edge intercepts the beam and one when the trailing edge intercepts the beam. The condenser 70 and resistor 71 differentiate these two voltage pulses and change their shape into a more suitable form for operating the modified Eccles-Jordan or bistable multi-vibrator device. The negative pulse produced by the leading edge of the bottle entering the light beam causes the left half of tube 72 to be cut off and the right half to conduct abruptly. The positive pulse which is caused by the trailing edge of the container hits the grid of the tube 72 and causes the left half of the tube to conduct and the right half to be cut off abruptly. The condenser 73 and the resistor 74 which are associated with a tube 72 differentiate the voltage pulses from the right hand half of the tube 72 and produce very sharp voltage pulses. These pulses are fed to the control grids of four thyratrons 120, 121, 122 and 123.

The thyratrons are normally not conducting, their shield grids being biased negatively. Referring, for example, to thyratron 120, a negative voltage is provided to its shield grid from the potentiometer 124 through the resistor 125. If no light is on the photocell of assembly 111, this negative bias is determined solely by the position of the arm on the potentiometer 124. However, if light strikes the photocell of assembly 111, a current will flow through the resistor 125. The voltage drop across the resistor 125 will tend to cancel out the negative bias applied from the potentiometer 124. The setting of the potentiometer is such that if there is no light striking the photocell of assembly 111 at the time the positive or gauging pulse caused by the trailing edge of the container reaches the control grid, the thyratron 120 will not fire. If, however, light is striking the photocell at the time the gauging pulse occurs, the thyratron 120 will fire, energizing the relay 80 and operate the reject solenoid 59 and mirror solenoid 110 moving mirror 107 out of the path of the container which is being rejected by solenoid 59. When the relay 80 closes it shorts out its supply voltage with one normally open contact and thus extinguishes the thyratron 120 and returns the solenoids 59, 110 to their normal positions. Thyratrons 121—123 are connected in circuits with an adjustable potentiometer and a resistor in the same manner as thyratron 120 and operate in the same way. The use of four thyratrons is preferred in order to avoid or subtracting the outputs from each of the photocell assemblies 111.

The operation of the apparatus shown in FIGS. 8 and 15 is represented on the voltage time curve in FIG. 14. As shown in FIG. 14, the output of each of the photocell assemblies 111 is reduced during the interim when a good container or bottle is being checked. That is, the light to the cell is interrupted at the time of the gauging pulse. However, if the light to the cell is not interrupted, the gauging pulse will cause an increase in the voltage output to the level where rejection will occur, as shown in dotted lines.

It can thus be seen that the concentricity of the finish of the container is checked. If the finish is not concentric, one or more of the light beams will reach its photocell when the bottom of the container is in gauging position and will energize one or more thyratrons thereby rejecting the container.

Figure 3:
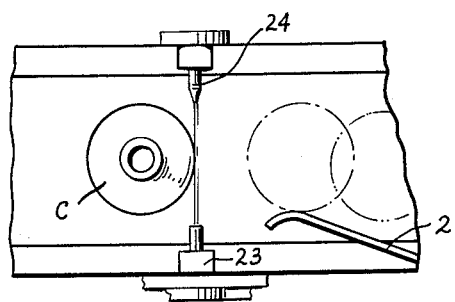
FIG. 3 is a fragmentary plan view of a portion of the apparatus shown in FIG. 1.
Figure 5:
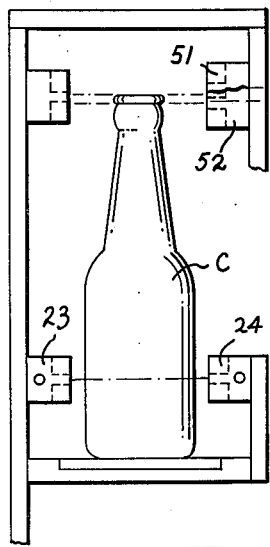
FIG. 5 is a diagrammatic front elevation of the apparatus shown in FIG. 2.

The apparatus shown in FIGS. 3 and 8 and the wiring diagram shown in FIGS. 7 and 15 are combined in a single apparatus so that at the time of the gauging pulse from the cell 24, the container is simultaneously checked for height and concentricity of the finish with the bottom of the container.

In each form of the invention which has been described, the conditioning pulse is supplied by the leading edge of the container and the gauging pulse is supplied by the trailing edge of the container. An alternative arrangement is to have the conditioning pulse and the gauging pulse produced substantially simultaneously by the leading or trailing edge of the container. A further alternative is to have the trailing edge of the container provide the conditioning pulse and the leading edge of a successive container provide the gauging pulse. The latter has the disadvantage that the gauging circuit is conditioned during the time that a new container is moving into gauging position so that it is subject to false signals between containers. The arrangement shown simplifies the electronic circuit since a delay is provided between the conditioning pulse and the gauging pulse so that the circuit need not be such that the conditioning and gauging pulse are substantially simultaneous. Also, this arrangement simplifies the physical arrangement of the apparatus since the rejecting mechanism can be positioned at the inspecting station so that it will not interfere with the inspecting mechanism. Since the gauging pulse is supplied by the trailing edge, the light source 23 and photocell assembly 24 are positioned out of the way of the reject solenoid 59 so that the container C can be rejected by movement laterally off the conveyor 21. The arrangement of the mechanism providing a conditioning pulse by the leading edge of the container and a gauging pulse by the trailing edge of the container has been found to give a more positive gauging pulse.

It can thus be seen that the invention provides for instantaneously comparing the position of one part of an article with one or more other parts of the article. This inspection is conducted while the article is moving continuously and without physical contact with any part being inspected.

I claim:

1. The method of simultaneously checking the height and alignment of the finish with the base of a hollow container which comprises moving said container continuously in a predetermined path, causing said container to intercept a transverse beam of radiant energy as it is moved continuously in said path, positioning a photocell in the path of said transverse beam and thereby causing a first pulse when the container enters said beam and a second pulse when the container leaves said beam, directing a beam of radiant energy horizontally and transversely of the upper end of the container, positioning a pair of photocells in such a manner that the line of sight of one cell to said second beam is interrupted and the line of sight of the other cell is uninterrupted if the container is of proper height, directing a plurality of additional beams of radiant energy against the finish of the container positioning a plurality of photocells in such a manner that the line of sight of each cell to its respective beam is interrupted if the finish of the container is properly aligned with the bottom of the container at the time of gauging, and causing said container to be rejected in the event that at the time of the second pulse, the relationship of said second beam to the container and said plurality of beams to the container is improper.

2. The method of simultaneously checking the height and concentricity of the finish with the base of a hollow container which comprises moving said container continuously in a predetermined path, causing said container to intercept a transverse beam of radiant energy as it is moved continuously in said path, positioning a photocell in the path of said transverse beam and thereby causing a first pulse when the container enters said beam and a second pulse when the container leaves said beam, directing a pair of beams of radiant energy horizontally and transversely of the upper end of the container so that one of said pair of beams is interrupted and the other of said beams is uninterrupted if the container is of proper height, directing a plurality of additional beams of radiant energy against the finish of the container in such a manner that each of said beams is interrupted if the finish of the container is concentric with the bottom of the container at the time of gauging, and causing a signal in the event that the relationship of said pair of beams and said plurality of beams is improper during said second voltage pulse.

3. The method of simultaneously checking the height and concentricity of the finish with the base of a hollow container which comprises moving said container continuously in a predetermined path, causing said container to intercept a first beam of radiant energy as it is moved continuously in said path, positioning a photocell in the path of said beam and thereby causing a first pulse when the container enters said beam and a second pulse when the container leaves said beam, directing a second beam of radiant energy horizontally and transversely of the upper end of the container, positioning a pair of photocells in such a manner that the line of sight of one cell to said second beam is interrupted and the line of sight of the other cell is uninterrupted if the container is of proper height, directing a plurality of additional beams of radiant energy against the finish of the container, positioning a plurality of photocells in such a manner that the line of sight of each cell to its beam is interrupted if the finish of the container is concentric with the bottom of the container at the time of gauging, and causing a signal in the event that the relationship of said second beam and said plurality of beams is improper during said second pulse.

4. The method of checking the height of a hollow container which comprises moving said container continuously in a predetermined path, causing said container to intercept a transverse beam of radiant energy as it is moved continuously in said path, positioning a photocell in the path of said beam and thereby causing a first pulse when the container enters said beam and a second pulse when the container leaves said beam, directing a second beam of radiant energy horizontally and transversely of the upper end of the container, positioning a pair of photocells in the normal path of the second beam in such a manner that the line of sight of one cell to said second beam is interrupted and the line of sight of the other cell is uninterrupted if the container is of proper height, and causing a signal in the event that the relationship of said container to said second beam and said pair of cells is such that radiant energy passes to both cells or is interrupted to both cells during said second pulse.

5. The method of checking the concentricity of the finish with the base of a hollow container which comprises moving said container continuously in a predetermined path, causing said container to intercept a transverse beam of radiant energy as it is moved continuously in said path, positioning a photocell in the path of said beam and thereby causing a first pulse when the container enters said beam and a second pulse when the container leaves said beam, directing a plurality of beams of radiant energy at an acute angle to the axis of the container against the finish of the container, positioning a plurality of corresponding photocells in the normal path of the beams in such a manner that the line of sight of each cell to its respective beam is interrupted if the finish of the container is concentric to the bottom of the container at the time of gauging, and causing a signal in the event that the relationship of the plurality of beams to their respective photocells is improper during said second pulse.

6. The method of simultaneously checking the height and concentricity of the finish with the base of a hollow container which comprises moving said container continuously in a predetermined path, causing said container to intercept a first beam of radiant energy as it is moved continuously in said path, positioning a photocell in the path of said beam and thereby causing a first pulse when the container enters said beam and a second pulse when the container leaves said beam, directing a second beam of radiant energy horizontally and transversely of the upper end of the container, positioning a pair of photocells in such a manner that the line of sight of one cell to said second beam is interrupted and the line of sight of the other cell is uninterrupted if the container is of proper height, directing a plurality of additional beams of radiant energy radially and upwardly and inwardly against the finish of the container, positioning a plurality of photocells radially downwardly and outwardly in such a manner that the line of sight of each cell to its beam is interrupted if the finish of the container is concentric with the bottom of the container at the time of gauging, and causing a signal in the event that the relationship of said second beam and said plurality of beams to said container is improper during said second pulse.

7. The method of checking the concentricity of the finish with the base of a hollow container which comprises moving said container continuously in a predetermined path, causing said container to intercept a transverse beam of radiant energy as it is moved continuously in said path, positioning a photocell in the path of said beam and thereby causing a first pulse when the container enters said beam and a second pulse when the container leaves said beam, directing a plurality of beams against the finish of the container, positioning a plurality of photocells with their lines of sight extending radially outwardly and downwardly in such a manner that the line of sight of each cell of its respective beam is interrupted if the finish of the container is concentric to the bottom of the container at the time of gauging, and causing a signal in the event that the relationship of the plurality of beams to their respective photocells is improper during said second pulse.

8. An apparatus for comparing the instantaneous position of one part of an article with another part of an article which comprises means for moving said article in a continuous path past an inspection station, a source of radiant energy mounted adjacent said inspection station for directing a beam of radiant energy transversely of said path in position to be intercepted by the article, a photocell positoned with its line of sight in position to intercept said beam of radiant energy whereby a first voltage pulse is produced when the article enters the beam and a second pulse is produced when the article leaves the beam, a second source of radiant energy directing a second beam of radiant energy in such a manner that said second beam is in predetermined relation to a second part of the article at the inspection station, and means causing a signal if said second beam of radiant energy is not in proper relation to said article during said second voltage pulse.

9. An apparatus for comparing the instantaneous position of one part of an article with another part of an article which comprises conveyor means for moving said article in a continuous path past an inspection station, means positioned in the path of said article in advance of said inspection station for positioning said article laterally on said conveyor, a source of radiant energy in position adjacent said inspection station for directing a beam of radiant energy transversely of said path in position to be intercepted by said article, a photocell positioned with its line of sight adapted to intercept said beam of radiant energy whereby a first voltage pulse is produced when the article enters the beam and a second voltage pulse is produced when the article leaves the beam, a second source of radiant energy for directing a second beam of radiant energy in predetermined relation to a second part of the article as it is brought to the inspection station by said conveyor means, and means causing a signal if said second beam of radiant energy is not in proper relation to said article during said second voltage pulse.

10. An apparatus for comparing the instantaneous position of one part of an article with another part of an article which comprises endless conveyor means for moving articles in succession in a continuous path past an inspection station, a spacing and positioning bar positioned in advance of the inspecting station in the path of said article and operable to position each article laterally of the conveyor and retard each article so that it is positioned longitudinally on the conveyor, means positioned in the path of said article in advance of said inspection station, a source of radiant energy in position adjacent said inspection station for directing a beam of radiant energy transversely of said path in position to be intercepted by said article, a photocell positioned with its line of sight adapted to intercept said beam of radiant energy whereby a first voltage pulse is produced when the article enters the beam and a second voltage pulse is produced when the article leaves the beam, a second source of radiant energy for directing a second beam of radiant energy in predetermined relation to a second part of the article as it is brought to the inspecting station by said conveyor means, and means causing a signal if said second beam of radiant energy is not in proper relation to said article during said second voltage pulse.

11. An apparatus for comparing the instantaneous position of one part of an article with another part of an article which comprises conveyor means for moving said article in a continuous path past an inspection station, means positioned in the path of said article in advance of said inspection station for positioning said article laterally on said conveyor, a source of radiant energy in position adjacent said inspection station for directing a beam of radiant energy transversely of said path in position to be intercepted by said article, a photocell positioned with its line of sight adapted to intercept said beam of radiant energy whereby a first voltage pulse is produced when the article enters the beam and a second voltage pulse is produced when the article leaves the beam, a second source of radiant energy for directing a second beam of radiant energy in predetermined relation to a second part of the article as it is brought to the inspecting station by said conveyor means, and a second cell having a narrow line of sight positioned with its line of sight in predetermined relation to said second source and said second part of the article.

12. The combination set forth in claim 11 wherein said second cell includes means defining an orifice forming the line of sight of the cell, said orifice having a length many times its diameter.

13. An apparatus for simultaneously checking the height and alignment of the finish with the base of a container which comprises conveyor means for moving said container continuously in a predetermined path past an inspection station, a first source of radiant energy mounted adjacent said inspection station for directing a beam of radiant energy transversely of the path of said container in position to be intercepted by said container, a photocell mounted adjacent said conveyor with its line of sight adapted to intercept said first beam of radiant energy whereby a first voltage pulse is produced when the container enters the beam and a second voltage pulse is produced when the container leaves the beam, a second source of radiant energy mounted at said inspection station for directing a collimated beam of radiant energy transversely of the path of the container in position to illuminate the finish of the container, a pair of photocells having limited fields of vision positioned in vertically spaced relation with their lines of sight adapted to see the second beam of radiant energy in such a manner that the line of sight of one of said cells is interrupted by the finish of the container and the line of sight of the other of the cells is uninterrupted when the container is at the inspecting station, a plurality of additional sources of radiant energy at said inspection station adapted to direct beams of radiant energy against the finish of the container, a plurality of associated photocells having limited fields of vision positioned relative to the plurality of beams in such a manner that the lines of sight of said photocells are interrupted by the finish of the container when the container is at the inspecting station if the concentricity of the finish with the base of the container is proper, and electronic means adapted to be energized if the relationship of the second beam and its associated photocell and the plurality of beams and their associated photocells is improper during the second voltage pulse.

14. The combination set forth in claim 13 wherein said electronic means comprises a thyratron tube associated with each of said pair of photocells and said plurality of photocells, electronic means for conditioning each said thyratron so that they are in condition to fire when said second voltage pulse occurs, and potentiometer means associated with each of said thyratrons for controlling the grid bias of the thyratrons, said potentiometers being associated with the respective cells of said thyratrons.

15. An apparatus for checking the height of a container which comprises conveyor means for moving said container continuously in a predetermined path past an inspection station, a first source of radiant energy mounted adjacent said inspection station for directing a beam of radiant energy transversely of the path of said container in position to be intercepted by said container, a photocell mounted adjacent said conveyor with its line of sight adapted to intercept said first beam of radiant energy whereby a first voltage pulse is produced when the container enters the beam and a second voltage pulse is produced when the container leaves the beam, a second source of radiant energy mounted at said inspection station for directing a collimated beam of radiant energy transversely of the path of the container in position to illuminate the finish of the container, a pair of photocells having limited fields of vision positioned in vertically spaced relation in such a manner that the line of sight of one of said cells is interrupted by the finish of the container and the line of sight of the other of the cells is uninterrupted when the container is at the inspecting station, and electronic means associated with said pair of photocells and adapted to be energized when the relationship of the second beam and the pair of photocells is improper during the second voltage pulse.

16. The combination set forth in claim 15 wherein said electronic means comprises a thyratron associated with each cell of said pair of photocells, rejection means adapted to be actuated by energization of either of said thyratrons, electronic means for conditioning said thyratrons upon the occurrence of said voltage pulse and for permitting the energization of said thyratrons during said gauging voltage pulse, a potentiometer individual to each said thyratron for applying a grid bias to each of said thyratrons, one of said pair of cells being so connected that light falling on the cell will increase the grid bias of its associated thyratron, and the other of said pair of cells being so connected that light falling on the cell will decrease the grid bias of its associated thyratron.

17. An apparatus for checking the alignment of the finish with the base of a container which comprises conveyor means for moving said container continuously in a predetermined path past an inspection station, a first source of radiant energy mounted adjacent said inspection station for directing a beam of radiant energy transversely of the path of said container in position to be intercepted by said container, a photocell mounted adjacent said conveyor with its line of sight adapted to intercept said first beam of radiant energy whereby a first voltage pulse is produced when the container enters the beam and a second voltage pulse is produced when the container leaves the beam, a plurality of additional sources of radiant energy at said inspection station adapted to direct beams of radiant energy against the finish of the container, a plurality of associated photocells having limited fields of vision positioned relative to the plurality of beams in such a manner that the lines of sight of said photocells are interrupted by the finish of the container when the container is at the inspecting station if the concentricity of the finish with the base of the container is proper, and electronic means adapted to be energized if the relationship of the plurality of beams and their associated photocells is improper during the second voltage pulse.

18. The combination set forth in claim 17 wherein said electronic means comprises a thyratron associated with each said cell of said plurality of cells, electronic means adapted to condition each thyratron for firing during said first voltage pulse and adapted to permit firing of each thyratron during said second voltage pulse, and a potentiometer associated with each thyratron, said photocells being so connected that light falling on the cells will decrease the grid bias of the associated thyratrons.

19. An apparatus for comparing the instantaneous position of one part of an article with another part of an article which comprises means for moving said article in a continuous path past an inspection station, a source of radiant energy mounted adjacent said inspection station for directing a beam of radiant energy transversely of said path in position to be intercepted by the article, a photocell positioned with its line of sight in position to intercept said beam of radiant energy whereby a gauging voltage pulse is produced when the article reaches the inspection station, a second source of radiant energy directing a second beam of radiant energy in such a manner that said second beam is in predetermined relation to a second part of the article at the inspection station, and a second photocell having a limited field of vision positioned with its line of sight in predetermined relation to a part of the article when the article is at the inspection station whereby said cell produces a voltage pulse if said second beam of radiant energy is not in proper relation to the article during said gauging pulse.

20. An apparatus for simultaneously checking the height and alignment of the finish with the base of a translucent container which comprises conveyor means for moving said container continuously in a predetermined path past an inspection station, a first source of radiant energy mounted adjacent said inspection station for directing a beam of radiant energy transversely of the path of said container in position to be intercepted by said container, a photocell mounted adjacent said conveyor with its line of sight adapted to intercept said first beam of radiant energy whereby a sudden change in output voltage of said photocell occurs when the container enters the beam, a gradual change in output voltage of the photocell occurs as the container moves through the light beam and a sudden change in output voltage occurs when the container leaves the beam, differentiating means associated with said photocell for thereby producing a first voltage pulse when the container enters the beam and a second voltage pulse when the container leaves the beam, a second source of radiant energy mounted at said inspection station for directing a collimated beam of radiant energy transversely of the path of the container in position to illuminate the finish of the container, a pair of photocells having limited fields of vision positioned in vertically spaced relation with their lines of sight adapted to see the second beam of radiant energy in such a manner that the line of sight of one of said cells is interrupted by the finish of the container and the line of sight of the other of the cells is uninterrupted when the container is at the inspecting station, a plurality of additional sources of radiant energy at said inspection station adapted to direct beams of radiant energy against the finish of the container, a plurality of associated photocells having limited fields of vision positioned relative to the plurality of beams in such a manner that the lines of sight of said photocells are interrupted by the finish of the container when the container is at the inspecting station if the concentricity of the finish with the base of the container is proper, and electronic means conditioned by said first voltage pulse and actuated by said second voltage pulse to produce a signal if the relationship of the second beam and its associated photocell and the plurality of beam and their associated photocells are improper during said second voltage pulse.

21. The combination set forth in claim 20 wherein said electronic means comprises a thyratron tube associated with each of said pair of photocells and said plurality of photocells, and multi-vibrator means adapted to be conditioned by said first voltage pulse and actuated by said second voltage pulse, said multi-vibrator means being associated with said thyratrons whereby said thyratrons are conditioned to produce a signal if their respective photocells are not in proper relationship to the container during the second voltage pulse.

22. An apparatus for checking the height of a translucent container which comprises conveyor means for moving said container continuously in a predetermined path past an inspection station, a first source of radiant energy mounted adjacent said inspection station for directing a beam of radiant energy transversely of the path of said container in position to be intercepted by said container, a photocell mounted adjacent said conveyor with its line of sight adapted to intercept said first beam of radiant energy whereby a sudden change in output voltage of said photocell occurs when the container enters the beam, a gradual change in output voltage of the photocell occurs if the container moves through the light beam and a sudden change in output voltage occurs when the container leaves the beam, a second source of radiant energy mounted at said inspection station for directing a collimated beam of radiant energy transversely of the path of the container in position to illuminate the finish of the container, a pair of photocells having limited fields of vision positioned in vertically spaced relation in such a manner that the line of sight of one of said cells is interrupted by the finish of the container and the line of sight of the other of the cells is uninterrupted when the container is at the inspecting station, and electronic means conditioned by said first voltage pulse and actuated by said second voltage pulse to produce a signal when the relationship of the second beam and the pair of photocells is improper during the second voltage pulse.

23. The combination set forth in claim 22 wherein said electronic means comprises a thyratron associated with each cell of said pair of photocells, a potentiometer individual to each said thyratron for applying a grid bias to each of said thyratrons, one of said pair of photocells being so connected that light falling thereon will increase the grid bias of its associated thyratron, and the other of said pair of photocells being so connected that light falling thereon will decrease the grid bias of its associated thyratron and multi-vibrator means associated with said differentiating means and said thyratrons in such a manner that said first voltage pulse conditions said thyratrons and said second voltage pulse actuates said thyratrons so that said thyratrons will produce a signal if their respective photocells are not properly associated with the container during the second voltage pulse.

24. An apparataus for checking the alignment of the finish with the base of a translucent container which comprises conveyor means for moving said container continuously in a predetermined path past an inspection station, a first source of radiant energy mounted adjacent said inspection station for directing a beam of radiant energy transversely of the path of said container in position to be intercepted by said container, a photocell mounted adjacent said conveyor with its line of sight adapted to intercept said first beam of radiant energy whereby a sudden change in output voltage of said photocell occurs when the container enters the beam, a gradual change in output voltage of the photocell occurs if the container moves through the light beam and a sudden change in output voltage occurs when the container leaves the beam, a plurality of additional sources of radiant energy at said inspection station adapted to direct beams of radiant energy against the finish of the container, a plurality of associated photocells having limited fields of vision positioned relative to the plurality of beams in such a manner that the lines of sight of said photocells are interrupted by the finish of the container when the container is at the inspecting station if the concentricity of the finish with the base of the container is proper, and electronic means conditioned by said first voltage pulse and actuated by said second voltage pulse to produce a signal when the relationship of the plurality of beams and their associated photocells is improper during the second voltage pulse.

25. The combination set forth in claim 24 wherein said electronic means comprises a thyratron associated with each cell of said plurality of cells, a potentiometer associated with each thyratron, said photocells being so connected that light falling on the cells will decrease the grid bias of the associated thyratrons.

26. The method of instantaneously inspecting the position of one part of an article with another part of the article as the article is moved continuously in a predetermined path, which method comprises causing said article to intercept a transverse beam of radiant energy as it is moved in said path, positioning a photocell in the path of said beam and thereby causing a first pulse when the article enters said beam and a second pulse when the article leaves said beam, directing another beam of radiant energy so that it is related to another part of the article when the second pulse occurs, directing a photocell in the path of said second beam, so that the relationship of said second photocell and said second beam is predetermined for an acceptable article, and causing a signal in the event that the relationship of said second beam and said second photocell is not found to be proper during said second voltage pulse.

27. The method of inspecting an article to determine whether a predetermined relationship exists between one part of the article and one or more other parts of the article which comprises moving said article in a predetermined path, causing said article to intercept a transverse beam of radiant energy as it moves through said path, thereby causing a voltage pulse when it enters the path of the beam and when it leaves the path of the beam, directing at least two additional beams of radiant energy at various parts of the article, said beams being positioned so that they are in a predetermined relation to the container when said second pulse occurs due to the container leaving the first beam of radiation if the container is within the desired limits, and causing said container to be rejected in the event that beams are found to be not in the predetermined relation when said second pulse occurs.

28. The method of comparing the instantaneous position of one part of a translucent article with another part of the article which comprises moving the article in a continuous path past an inspecting station, causing the article to intercept a first beam of radiant energy thereby creating a sudden change in the light transmitted through the article when the article enters the beam and a sudden change in the transmission of the beam through the article when the article leaves the beam, directing a second beam of radiant energy in such a manner that it is in predetermined relation to a part of the article when the article leaves the first beam at the inspection station, and causing said change in transmission occurring when the article enters the light beam to condition an electronic circuit and causing said change in transmission when the article leaves the beam to actuate said electronic means and create a signal when the second beam of radiant energy is not in proper relation to the article.

29. An apparatus for checking the height of a container which comprises conveyor means for moving said container continuously in a predetermined path past an inspection station, a source of radiant energy mounted adjacent said inspection station for directing a beam of radiant energy transversely of said path in position to be intercepted by the container, a photocell positioned with its line of sight in position to intercept said beam of radiant energy whereby a gauging voltage pulse is produced when the container reaches the inspection station, a second source of radiant energy mounted at said inspection station for directing a collimated beam of radiant energy transversely of the path of the container in position to illuminate the finish of the container, a pair of photocells positioned in vertical spaced relation in such a manner that the line of sight of one of said cells is interrupted by the finish of the container and the line of sight of the other of said cells is uninterrupted when the container is at the inspection station if the container is of proper height whereby said last-mentioned cells produce a voltage pulse if the container produces an improper relationship of the second beam and the pairs of photocells during the gauging pulse.

30. An apparatus for checking alignment of the finish with the base of a container which comprises conveyor means for moving said container continuously in a predetermined path past an inspection station, a first source of radiant energy mounted adjacent said inspection station for directing a beam of radiant energy transversely of the path of said container in position to be intercepted by said container, a photocell positioned with its line of sight in position to intercept said beam of radiant energy whereby a gauging voltage pulse is produced when the container reaches the inspection station, a plurality of additional source of radiant energy at said inspection station adapted to direct beams of radiant energy against the finish of the container, a plurality of associated photocells positioned relative to the plurality of beams in such a manner that the lines of sight of said photocells are interrupted by the finish of the container when the container is at the inspection station if the concentricity of the finish with the base of the container is proper, whereby said plurality of cells produces a voltage pulse if the container produces an improper relationship of the plurality of beams and their associated photocells during said gauging pulse.

References Cited in the file of this patent

UNITED STATES PATENTS

| | | |
|---|---|---|
| 2,085,671 | Powers | June 29, 1937 |
| 2,280,948 | Gulliksen | Apr. 28, 1942 |
| 2,524,929 | Razek | Oct. 10, 1950 |
| 2,902,151 | Miles | Sept. 1, 1959 |
| 2,936,886 | Harmon | May 17, 1960 |